March 24, 1942.                F. W. HARTMAN                2,277,547
                          GAS CONDITIONING APPARATUS
                             Filed Nov. 25, 1939
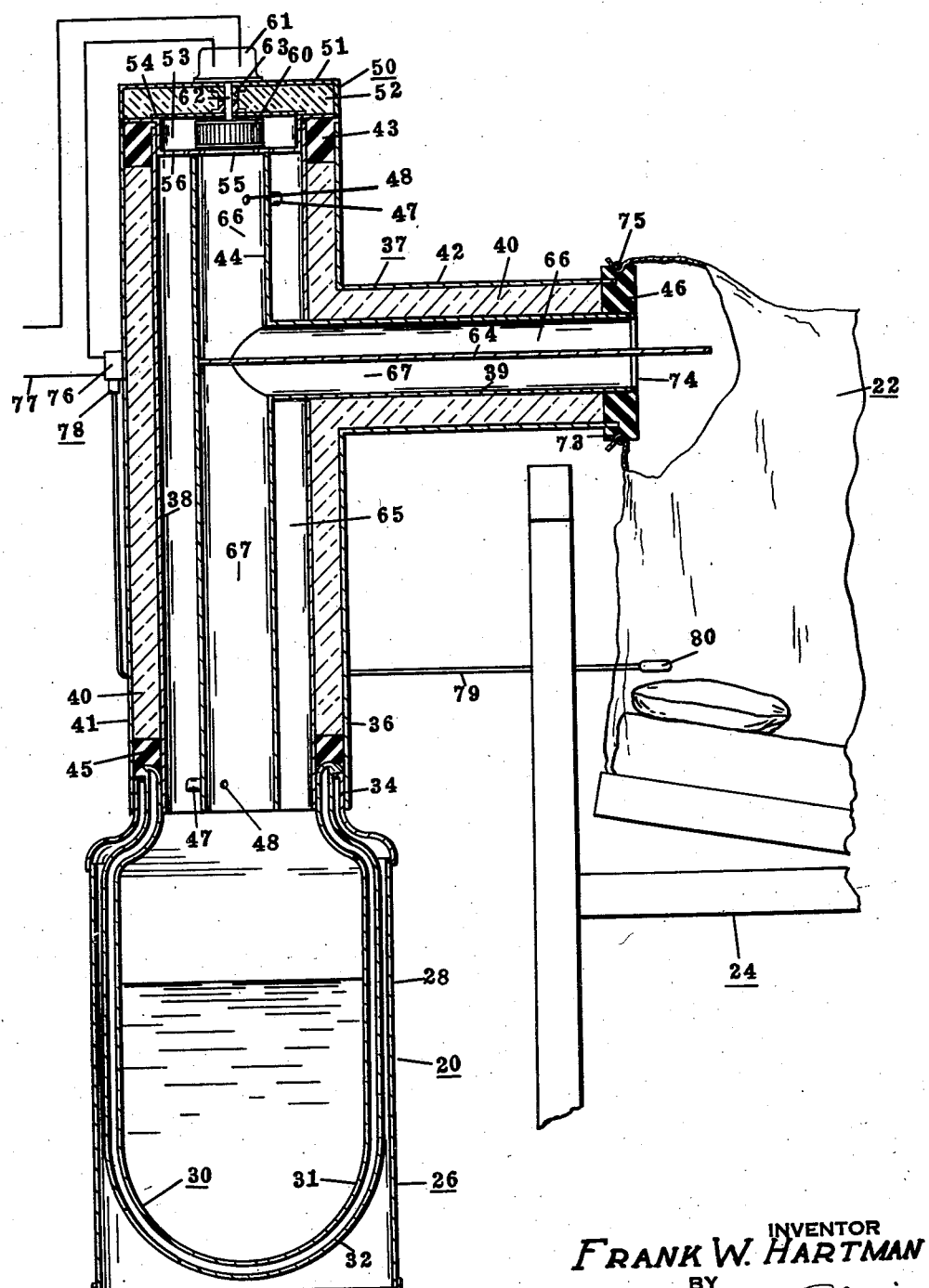
INVENTOR
*FRANK W. HARTMAN*
BY
ATTORNEY Patented Mar. 24, 1942

2,277,547

UNITED STATES PATENT OFFICE 2,277,547

GAS CONDITIONING APPARATUS

Frank W. Hartman, Detroit, Mich., assignor to Henry Ford Hospital, Detroit, Mich., a corporation of Michigan Application November 25, 1939, Serial No. 306,161

2 Claims. (Cl. 128—191)

This invention relates to a method and apparatus for conditioning gas within an inclosure, and more particularly to a method and apparatus for cooling and conditioning air within an inclosure for breathing purposes.

An object of the invention is to condition the gas in an inclosure by forcing the gas over the surface of a volatile liquid having a low boiling point to cause certain noxious gases to condense and solidify in the liquid, where they may be readily removed, and then directing the gas from the inclosure, together with the volatilized gas, back into the inclosure.

A further object of the invention is to conduct the gases of the inclosure to the liquid through a passage having walls in heat exchange relation with the gas being directed from the liquid back to the inclosure.

A still further object of the invention is to regulate the rate of circulation of the gas from the inclosure over the volatile liquid according to the condition of the gas in the inclosure.

Other and further objects and advantages will be apparent from the following description, reference being had to the accompanying drawing wherein a preferred form of embodiment of the present invention is clearly shown.

The drawing shows a sectional view of a gas conditioning apparatus for conditioning the air within an "oxygen tent" fitted over a bed, the bed and tent being only partly shown.

Referring to the drawing, a gas conditioning apparatus 20 is shown for conditioning air and, in the particular embodiment illustrated, for conditioning air in a tent 22. The tent is shown as erected over a bed 24 for forming an air tight inclosure in which a patient may be placed. The apparatus 20 conditions the air in the tent by removing the noxious gases of respiration given off by the patient, cooling the air and supplying oxygen to the air.

The apparatus 20 includes a container 26 constructed similarly to the well known Dewar flask, having on outer metal shell 23 and an inner vessel 30. The vessel 30 comprises two spaced walls 31 and 32, formed of glass, which walls are joined together and sealed around the tops thereof. The space between the walls 31 and 32 is evacuated to minimize heat transfer between the walls. The container 26 is particularly suitable for storing liquefied gases which have low boiling points.

The container 26 is open at the top thereof and a neck 34 is formed around the opening. A vertical tube 36 is mounted over the neck, which tube has an open end tubular section 37 extending from one side thereof. The tube 37 is adapted to extend over the head of the bed 24. The tubes 36 and 37 include inner pipes 38 and 39, respectively, insulation 40 and outer pipes 41 and 42. Each of these pipes is formed of a sheet of metal rolled into a cylinder and joined along the seams by welding or soldering. The pipes 38 and 41 are separated at the bottom and retain a soft rubber gasket 45. The pipes 38 and 41 extend down beyond the gasket for receiving the neck 34 of the container 26. The rubber gasket 45 rests upon the neck and thereby seals the top of the container. A soft rubber gasket 43 is disposed between the upper part of pipes 38 and 41. This gasket is provided with inwardly and outwardly extending flanges for covering the edges of the pipes 38 and 41. Pipe 42 is joined with pipe 41 by soldering or welding and pipe 39 extends through pipe 38 and is joined at the inner end with a pipe 44. The space between the forward end of pipes 39 and 41 is closed by a collar 46. Pipe 44 is disposed within the pipe 38 and is suitably held in position by suitable spacing members 47 and bolts 48.

The upper end of the tube 36 is closed by a cover 50, which cover is formed by a sheet metal shell 51 formed over an insulation block 52. The shell 51 is shaped to form a compartment 53. A plate 54 covers the insulation 52. The walls of the shell 51, forming the compartment 53, closely fit the inner pipe 38 of the tube 36 and the lower wall thereof engages the upper end of the pipe 44.

An opening 55 in the bottom wall of compartment 53 registers with pipe 44 and a plurality of openings 56 in the bottom wall of compartment 53 register with the circular space between pipe 44 and pipe 38.

A Sirocco type fan 60 is disposed in the compartment 53 in register with the opening 55. The fan is driven by an electric motor 61 mounted on the outside of the cover 50 and connected with the fan by a shaft 62 journaled in a bushing 63. The fan 60 draws air through the opening 55 and into compartment 53 and expells the same through the passages 56. A horizontally disposed partition 64 extends longitudinally within pipe 39 and the edges are joined hermetically with the inside of pipe 39. The left rear end of partition 64 is semicircular and is joined hermetically with the rear side of pipe 44. The pipes 38, 39, and 44 thus provide three distinct passages. Passage 65 is circular and surrounds pipe 44; the upper part of pipe 44 and the upper half of pipe 39 form passage 66 and the lower part of pipe 44 and the lower half of pipe 39 form passage 67.

The hard rubber collar 46 which is disposed over the open end of the tube 37 has a groove 73 formed around the periphery thereof for receiving material of the tent 22 adjacent the edges of an opening 74 formed in the tent. This material is held in frictional engagement with the walls of the groove 73 by an elastic wire 75 or rubber band to form an air tight seal between the tent and the tube.

When the fan is operated, air will be withdrawn from the tent 22 through passage 66 and opening 55 and expelled into compartment 53. The air then passes through the passages 56 and downward through the passage 65 into the container 26. The air is then forced from the container 26 through the passage 67 back into the tent. Preferably the partition 64 extends forwardly of the tube 37 for preventing diffusion of stale and fresh gases at the forward end of the tube.

The motor 61 is connected in a power line 77 and a thermostatically regulated rheostat 76, mounted on the tube 36, is also connected in the line 77 in series circuit with the motor for regulating the speed thereof. The rheostat 76 may be of any suitable design, and in the present disclosure, a vapor filled thermal element 78 is adapted to actuate a rheostat element. The thermal element 78 comprises a tube 79 having a bulb 80 at one end, which bulb is placed inside the tent 22. The other end of the tube 79 is connected with a suitable pressure responsive device such as a bellows, for example, and the pressure responsive device actuates the rheostat element in response to changes in pressure of the vapor in the bulb 80. Preferably the rheostat is designed to increase the resistance in the line 77 as the temperature in the tent is lowered to thereby retard the motor speed and to decrease the resistance in the line as the temperature is raised to increase the motor speed.

When the apparatus 20 is operated, liquefied oxygen is placed in the container 26 and the power line 77 is energized. Air from the tent 22 is drawn in the inlet passage 66 by the fan 60 and is forced downwardly through passage 65 and into contact with the liquid oxygen. Noxious gases such as carbon dioxide, and moisture given off by respiration of the patient in the tent, condense and solidify in the liquid oxygen since the freezing point of carbon dioxide and water are above the temperature of liquid oxygen. Heat from the air circulated over the liquid oxygen is absorbed by the liquid which causes oxygen to boil off and pass out into the tent through the outlet passage with the cooled, purified gas. The solidified materials which were formerly noxious gases and moisture may be removed from the liquid oxygen from time to time by a ladle through the opening in the top of the container 26.

It is to be noted that the cool gas passing through the outlet passage 67 will absorb some of the heat from the incoming gas through the heat conducting walls of tube 44 and partition 64. This provides a thorough and uniform cooling of the air circulated through the apparatus 20.

When the temperature of the air in the inclosure rises above that desired, the rheostat 76 will automatically increase the speed of the motor 61 to cause more rapid circulation of the gases and consequently more heat will be removed from the gases by the liquid oxygen to provide a cooler atmosphere within the tent.

If it should be desirable to increase the rate of oxygen supply, the speed of the motor 61 could be increased by manual adjustment of the rheostat to cause more rapid volatilization of the oxygen.

It is to be understood that other liquefied gases, for example, liquid air, may be employed for similar purposes and that the gases to be conditioned may be from other sources than an oxygen tent.

While the form of embodiment of the present invention as herein disclosed constitutes a preferred form, it is to be understood that other forms might be adopted, all coming within the scope of the claims which follow.

I claim:

1. An apparatus for conditioning gas in an inclosure comprising in combination, a container of volatile fluid, said container having an opening in the top thereof; a tube having one end connected with the opening in the container and extending substantially vertical; a tube disposed axially within the first mentioned tube for forming two passages; a Sirocco type blower, the inlet of the blower being connected with the upper end of one of the tubes and the outlet of the blower connected with the other of the tubes; a third tube having one end extending through a wall of the first mentioned tube and connected with the second mentioned tube; and a wall extending lengthwise of the last mentioned tube, and transversely of the tube for dividing the tube into two passages, one end of said wall extending into the second mentioned tube and intersecting the second mentioned tube.

2. An apparatus for conditioning gas in an inclosure comprising in combination, a container of volatile fluid, said container having an opening in the top thereof; a tube having one end connected with the opening in the container and extending substantially vertical; a tube disposed axially within the first mentioned tube for forming two passages; a Sirocco type blower, the inlet of the blower being connected with the upper end of one of the tubes and the outlet of the blower connected with the other of the tubes; a third tube having one end extending through a wall of the first mentioned tube and connected with the second mentioned tube; means disposed on the other end of the third tube for connecting the tube with a tent or tent like inclosure; and a wall extending lengthwise of the last mentioned tube, and transversely of the tube for dividing the tube into two passages, one end of said wall extending into the second mentioned tube and intersecting the second mentioned tube.

FRANK W. HARTMAN.